United States Patent

Arai et al.

Patent Number: 5,193,946
Date of Patent: Mar. 16, 1993

[54] CUTTING INSERT

[75] Inventors: Tatsuo Arai; Takehiro Takada, both of Ibaraki, Japan

[73] Assignee: Mitsubishi Materials Corporation, Tokyo, Japan

[21] Appl. No.: 846,609

[22] Filed: Mar. 5, 1992

[30] Foreign Application Priority Data

Mar. 7, 1991 [JP] Japan ............................. 3-042052

[51] Int. Cl.$^5$ .......................................... B23C 5/20
[52] U.S. Cl. ........................................ 407/113; 407/42
[58] Field of Search ............................. 407/113–116, 407/34, 53, 47, 54, 61, 62, 42

[56] References Cited

U.S. PATENT DOCUMENTS

| | | | |
|---|---|---|---|
| 4,699,549 | 10/1987 | Shimomura et al. | 407/113 X |
| 4,934,880 | 6/1990 | Stashko | 407/114 X |
| 5,052,863 | 10/1991 | Satran | 407/113 |
| 5,071,291 | 12/1991 | Kaminski | 407/114 X |
| 5,071,292 | 12/1991 | Satran | 407/113 X |

FOREIGN PATENT DOCUMENTS

| | | |
|---|---|---|
| 125568 | 11/1984 | European Pat. Off. ............ 407/114 |
| 0372717 | 6/1990 | European Pat. Off. . |
| 1477885 | 12/1969 | Fed. Rep. of Germany . |
| 459715 | 9/1968 | Switzerland . |

Primary Examiner—Steven C. Bishop
Attorney, Agent, or Firm—Cushman, Darby & Cushman

[57] ABSTRACT

A cutting insert is disclosed which includes a polygonal plate-like insert body defined by a front face, a rear face and a plurality of side faces lying between the front face and the rear face. The insert body has at least one main cutting edge defined by the intersection of the front face with one of the side faces and at least one nose portion intersecting the at least one main cutting edge and defined by one of the corners of the front face. The front face has an inclined surface extending immediately from the nose portion and sloping toward the rear face in a direction away from the nose portion.

6 Claims, 7 Drawing Sheets

CUTTING INSERT

BACKGROUND OF THE INVENTION

1. Field of the Invention

The present invention relates to an indexable cutting insert which may be attached to various kinds of insert cutters.

2. Prior Art

Figure 19:
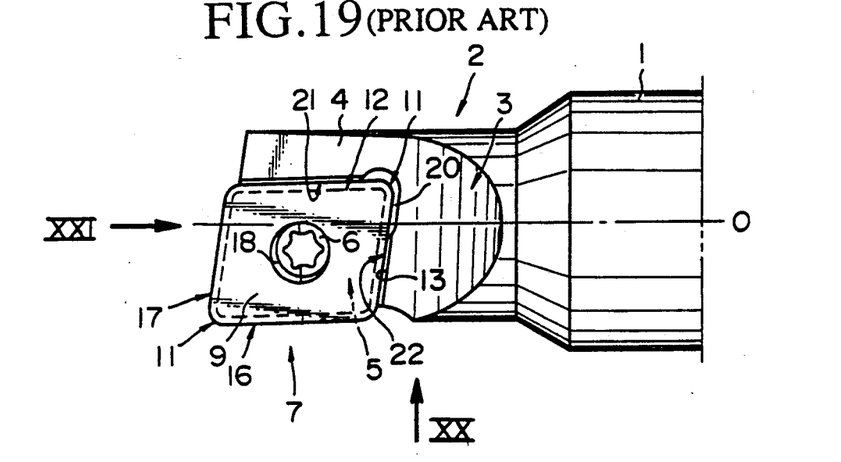
FIG. 19 is a plan view of an end mill to which a conventional insert is secured.
Figure 20:
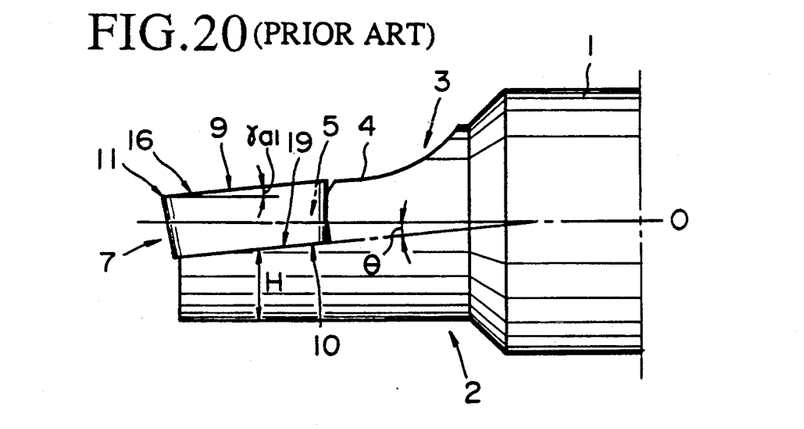
FIG. 20 is a side elevational view of the end mill of FIG. 19 as seen in the direction indicated by the arrow XX in FIG. 19.
Figure 21:
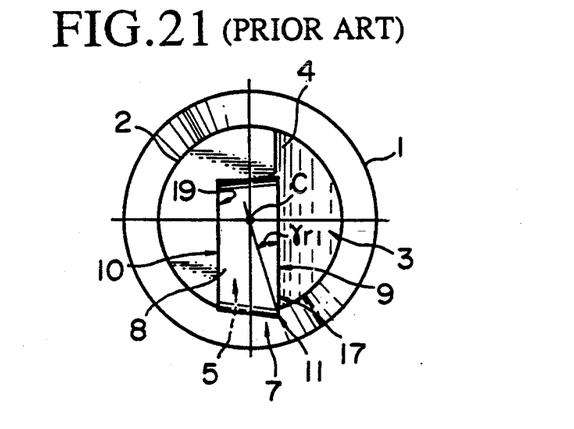
FIG. 21 is a front elevational view of the end mill of FIG. 19 as seen in the direction indicated by the arrow XXI in FIG. 19.

FIGS. 19 to 21 depict an end mill which utilizes a conventional, indexable cutting insert. The end mill comprises a cylindrical tool body 1 having an axis of rotation O therethrough and having an axially forward end portion 2 of a reduced diameter. A chip pocket 3 is formed in the forward end portion 2 in such a manner that the thickness of the portion 2 increases gradually in an axially rearward direction of the tool body 1. An insert-receiving recess 5 is formed in the foremost corner of the bottom 4 of the chip pocket 3 which is facing in a direction of rotation of the tool body 1, and an indexable cutting insert 7 is received in the insert receiving recess 5 and secured thereto by means of a clamp screw 6.

The insert 7 is of a positive type and has generally parallelogrammic front and rear faces 9 and 10 disposed parallel to each other, the front face 9 serving as a rake surface while the rear face 10 serves as a seating surface to be held in contact with a bottom 19 of the insert receiving recess 5. A diagonally opposite pair of acute corners of the front face 9 are formed into nose portions 11 and 11, respectively. Furthermore, each pair of marginal ridges of the front face 9, which are disposed so as to sandwich a respective nose portion 11 therebetween, define a peripheral cutting edge 16 and an end cutting edge 17, respectively. In addition, the insert body 8 has a central mounting aperture 18 formed therethrough.

Moreover, the insert receiving recess 5, to which the above insert 7 is secured, is shaped in conformity with the insert body 8 such that the cutting edges 16, 17 and 11 protrude from the tool body 1 and can be indexed in active cutting positions. Furthermore, the bottom 19 of the insert receiving recess 5 is flat and is inclined with respect to the axis O of the tool body 1 in such a manner that the thickness H of the forward end portion 2 increases gradually in an axially rearward direction of the tool body 1.

In the end mill as described above, the insert 7 undergoes a large cutting load when brought into engagement with a workpiece to cut it, and hence it is preferable that a sufficient rigidity is imparted to the forward end portion 2 of the tool body 1. For this reason, the chip pocket 3 is formed in such a manner that the thickness of the forward end portion 2 increases gradually in an axially rearward direction of the tool body 1, and the bottom 19 of the insert receiving recess 5 is formed in such a manner that it is inclined with respect to the axis O of the tool body 1, and that the thickness H of the forward end portion 2 of the tool body 1 increases gradually in an axially rearward direction of the tool body 1.

However, when the insert 7, in which the rake surface and the seating surface are formed parallel to each other, is secured to the insert receiving recess 5, the rake surface of the insert 7 will also become inclined with respect to the axis O of the tool body 1. Therefore, when an angle defined between the bottom 19 of the insert receiving recess 5 and the axis O of the tool body 1 is set to a prescribed value $\theta$, the axial rake angle $\gamma_{a1}$ for the insert 7 comes to have the same absolute value $\theta$, but becomes negative, and consequently, deterioration of the cutting performance cannot be avoided.

Furthermore, the radial rake angle $\gamma_{r1}$ of the insert 7 is determined by the thickness H of the forward end portion 2 of the tool body 1 and the thickness of the insert 7. However, in order to impart a sufficient rigidity to the forward end portion 2 of the tool body 1, its thickness H cannot be reduced. In addition, the thickness of the insert 7 cannot be reduced either in consideration of its rigidity or strength. As a result, the radial rake angle $\gamma_{r1}$ becomes unduly large in a negative direction, and the cutting performance is thereby further deteriorated.

SUMMARY OF THE INVENTION

It is therefore an object and feature of the present invention to provide a cutting insert which exhibits a superior cutting performance while ensuring a sufficient rigidity at a forward end portion of a tool body.

According to the present invention, there is provided a cutting insert comprising a polygonal plate-like insert body defined by a front face, a rear face and a plurality of side faces lying between the front face and the rear face, the insert body having at least one main cutting edge defined by the intersection of the front face with one of the side faces and at least one nose portion intersecting the at least one main cutting edge and defined by one of the corners of the front face, the front face having an inclined surface extending immediately from the nose portion and sloping toward the rear face in a direction away from the nose portion.

In the above cutting insert, the front face has an inclined surface sloping toward the rear face in a direction away from the nose portion, and hence the marginal ridges of the front face sandwiching the nose portion are inclined toward the rear face in a direction away from the nose portion. Therefore, when the insert of this construction is secured to an insert-receiving recess, the bottom of which is inclined such that the thickness of the forward end portion of the tool body increases gradually in an axially rearward direction of the tool body, that marginal ridge which serves as a peripheral cutting edge can be arranged so as to be inclined toward the rear face in an axially rearward direction of the tool body with respect to the axis of the tool body. As a result, the axial rake angle for the insert can be set so as to be positive. Furthermore, with the above construction of the insert, the marginal ridge disposed at an axially forward position is inclined toward the rear face in a direction away from the nose portion, and hence the radial rake angle for the insert can be set so as to be larger in a positive direction than in the prior art.

Moreover, as is the case with the conventional tool, the forward end portion of the tool body can be designed so that the thickness increases gradually in an axially rearward direction of the tool body. Therefore, a sufficient rigidity can be ensured at this forward portion.

Thus, in the present invention, both of the axial and radial rake angles can be set large, so that an excellent cutting performance can be attained. In addition, a sufficient rigidity can be ensured at the forward end portion of the tool body.

DESCRIPTION OF THE PREFERRED EMBODIMENTS OF THE INVENTION

FIGS. 1 to 4 depict a cutting insert in accordance with a first preferred embodiment of the present invention. The insert, generally designated by the numeral 31, is of a positive type, and comprises a generally parallelogrammic plate-like body 32 defined by a front face 33, a rear face 42 and two opposite pairs of longer and shorter side faces 35 and 36 lying between the front face 33 and the rear face 42. The insert body 32 includes a pair of generally straight main cutting edges 39 each defined by the intersection 37 of the front face with a respective one of the longer side faces 35 and a pair of auxiliary cutting edges 40 each defined by the intersection 38 of the front face with a respective one of the shorter side faces 38, the main cutting edge 39 serving as a peripheral cutting edge while the auxiliary cutting edge 40 serves as an end cutting edge. In addition, the front face serves as a rake surface while each side face serves as a relief surface for a corresponding cutting edge. Furthermore, a diagonally opposite pair of acute corners of the front face 33 define a pair of nose portions 34, each of which intersects the main and auxiliary cutting edges 39 and 40 disposed adjacent thereto. Moreover, the insert body 32 has a central mounting aperture 41 formed therethrough.

The front face 33 of the insert body 32 is defined by a pair of inclined surfaces 33a each extending immediately from a respective nose portion 34 and sloping toward the rear face 42 of the insert body 32 in a direction away from the aforesaid nose portion 34 toward the diagonal line which connects a pair of obtuse corners of the front face 33, and hence the intersections 37 and 38 are inclined toward the rear face 42 in a direction away from the aforesaid nose portion 34 toward the obtuse corners, respectively. Thus, as shown in FIG. 2, the front face 33 is formed into a V-shape as viewed in a side elevation along the diagonal line of the front face which connects the obtuse corners of the front face.

Figures 1, 2:
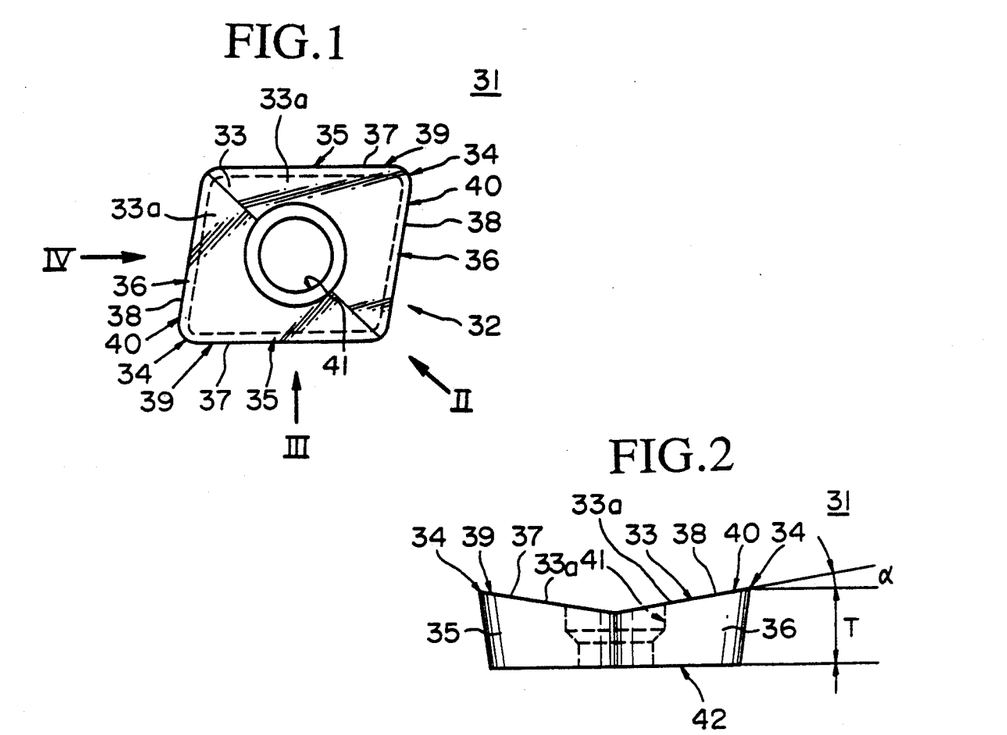
FIG. 1 is a plan view of a cutting insert in accordance with an embodiment of the present invention.
FIG. 2 is a side elevational view of the insert of FIG. 1 as seen in the direction indicated by the arrow II in FIG. 1.
Figure 3:
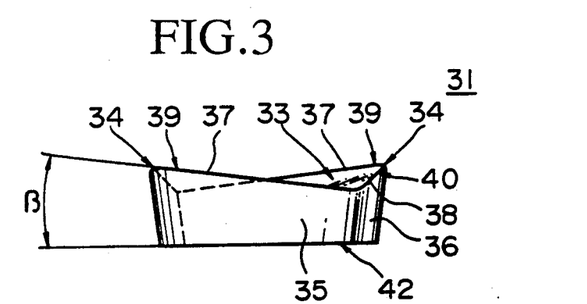
FIG. 3 is a side elevational view of the insert of FIG. 1 as seen in the direction indicated by the arrow III in FIG. 1.
Figure 4:
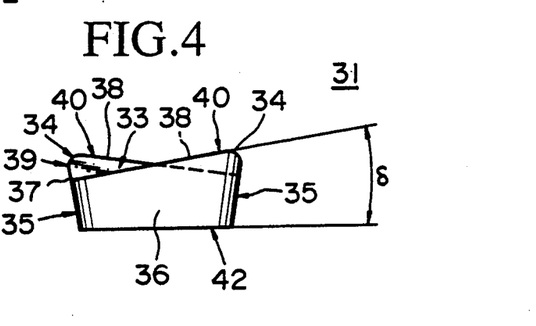
FIG. 4 is a side elevational view of the insert of FIG. 1 as seen in the direction indicated by the arrow IV in FIG. 1.

In the illustrated embodiment, the rear face 42 of the insert body 32 is defined by a flat surface, and the character $\alpha$ in FIG. 2 denotes the maximum of an angle defined between the rear face 42 and the front face 33, i.e., an inclination angle of the front face 33 in a cross-section vertical to the diagonal line connecting the obtuse corners of the front face. In addition, the character $\beta$ in FIG. 3 denotes an angle defined between the intersection 37 and the rear face 42, and the character $\delta$ in FIG. 4 denotes an angle defined between the other intersection 38 and the rear face 42.

Figure 5:
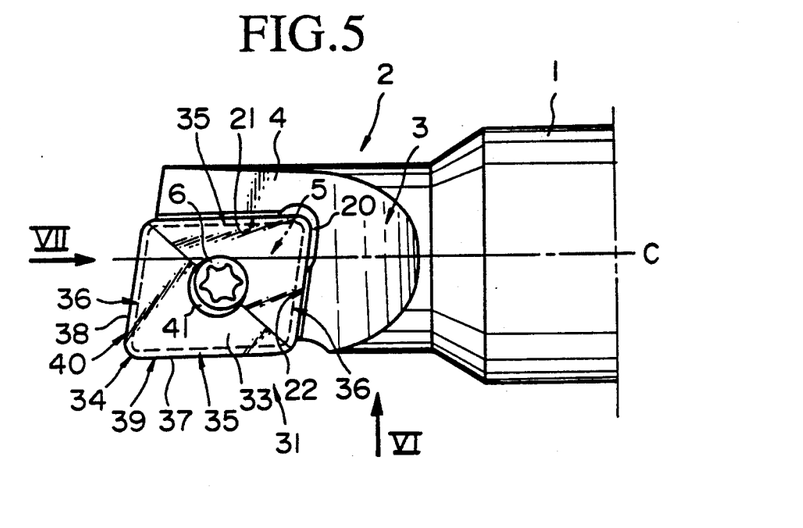
FIG. 5 is a plan view of an end mill to which the insert of FIG. 1 is attached.
Figure 6:
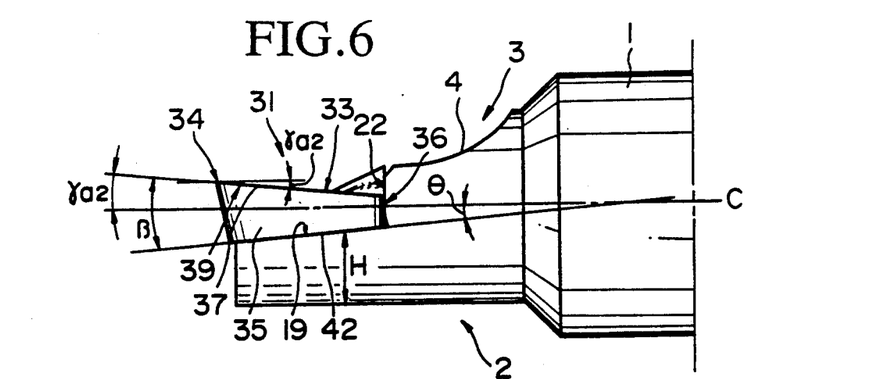
FIG. 6 is a side elevational view of the end mill of FIG. 5 as seen in the direction indicated by the arrow VI in FIG. 5.
Figure 7:
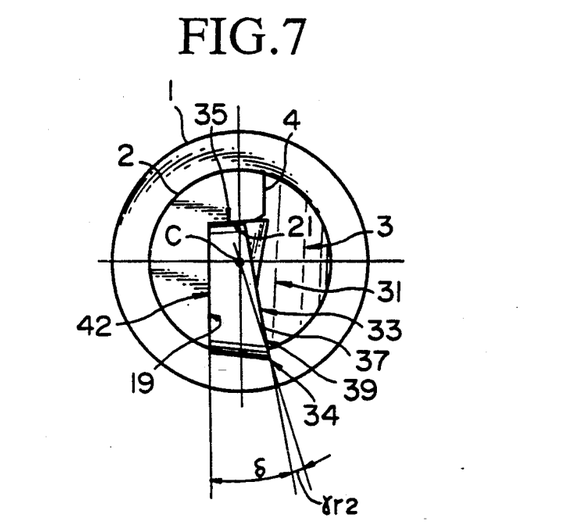
FIG. 7 is a front elevational view of the end mill of FIG. 5 as seen in the direction indicated by the arrow VII in FIG. 5.
Figure 8:
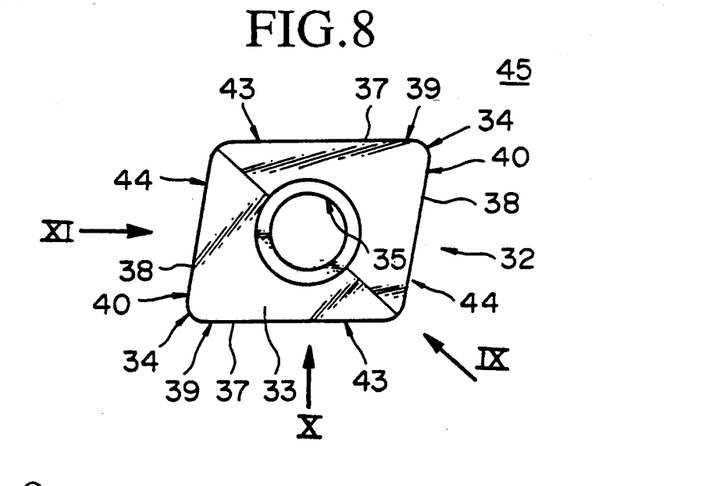
FIG. 8 is a plan view of a cutting insert in accordance with another embodiment of the present invention.
Figure 9:
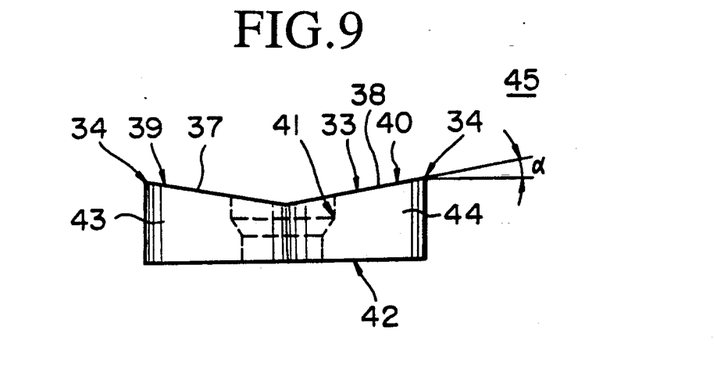
FIG. 9 is a side elevational view of the insert of FIG. 8 as seen in the direction indicated by the arrow IX in FIG. 8.
Figure 10:
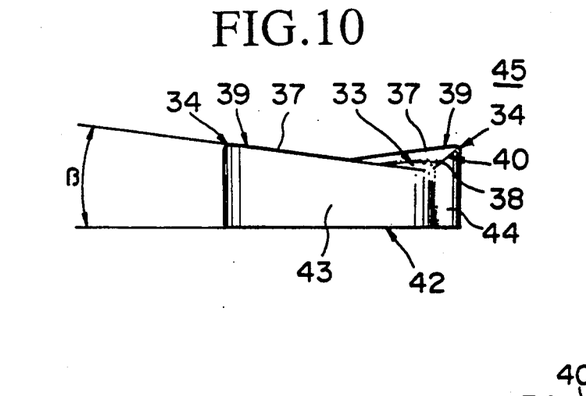
FIG. 10 is a side elevational view of the insert of FIG. 8 as seen in the direction indicated by the arrow X in FIG. 8.
Figure 11:
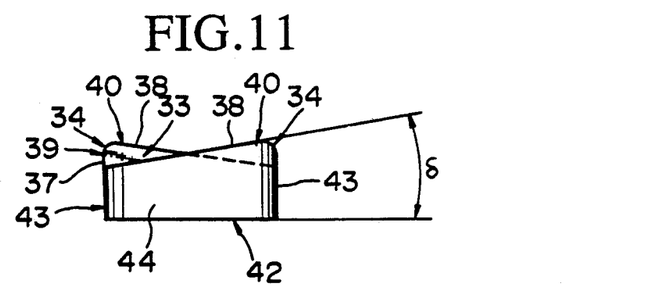
FIG. 11 is a side elevational view of the insert of FIG. 8 as seen in the direction indicated by the arrow XI in FIG. 8.

As shown in FIGS. 5 to 7, the aforesaid insert 31 is secured to a tool body in the same manner as in the end mill of FIGS. 19 to 21.

More specifically, a chip pocket 3 is formed in a forward end portion 2 of a reduced diameter in such a manner that the thickness of the forward portion 2 is gradually increased in an axially rearward direction of the tool body. An insert receiving recess 5 is formed in the foremost corner of the bottom 4 of the chip pocket 3 which is directed in a direction of rotation of the tool body 1, and the aforesaid cutting insert 31 is received in the insert receiving recess 5 and secured thereto by means of a clamp screw 6.

The insert receiving recess 5 is shaped into such a form that when the insert 31 is received therein, the cutting edges 39, 40 and 34 protrude from the tool body 1 and are indexed in active cutting positions, with the side faces 35 and 36, sandwiching the indexed nose portion 34 therebetween, being held in abutment with walls 21 and 22 of the insert receiving recess 5, respectively. Furthermore, a recess 20 of an elliptical shape in plan view is formed at the inner corner of the insert receiving recess 5 into which its walls 21 and 22 merge, whereby the inactive nose portion 34 is prevented from contacting the walls 21 and 22 of the recess 5 when securing the insert 31 to the recess 5.

Furthermore, the bottom 19 of the insert receiving recess 5 is formed so as to be flat and is inclined with respect to the axis 0 of the tool body 1 in such a manner that the thickness H of the forward end portion 2 of the tool body 1 is gradually increased in an axially rearward direction of the tool body 1. In the illustrated embodiment, the angle defined between the bottom 19 and the axis of the tool body, i.e., the inclination angle of the bottom 19, is set to $\theta$ and is equal to that of the conventional end mill. Furthermore, although not shown in the drawings, an internally threaded aperture is formed in the center of the bottom 19 such that an axis of the aperture is slightly shifted toward the inner corner of the insert receiving recess 5 from the axis of the aperture 41 of the insert body 32 when the insert 31 is received in the insert receiving recess 5.

For mounting the insert 31 on the tool body 1, the insert 31 is first received in the insert receiving recess 5 and the clamp screw 6 is then turned to bring the rear face 42 of the insert body 32 into pressing abutment with the bottom 19 of the insert receiving recess 5. As a result, the insert body 32 is pressed toward the inner corner of the insert receiving recess 5 due to the shifting between the axis of the internally threaded aperture of the insert receiving recess 5 and the axis of the aperture 41 of the insert body 32, with the side faces 35 and 36 sandwiching the inactive nose portion 34 being held in abutment with the walls 21 and 22 of the recess 5, and the main and auxiliary cutting edges 39 and 40 are protruded from the forward end portion 2 of the tool body 1 and indexed properly into the peripheral and end cutting positions, respectively.

In the foregoing, those portions of the insert body 32 which are adjacent to the inactive nose portion 34 are prevented from contacting the insert receiving recess 5 due to the provision of the recess 20 in the inner corner of the insert receiving recess 5. Therefore, the above cutting edges 39 and 40 can be positioned in place very accurately, and the formation of the insert receiving recess 5 is easy.

As described above, the front face 33, which serves as the rake surface, has an inclined surface 33a sloping toward the rear face 42 in a direction away from the active nose portion 34 at an inclination angle $\alpha$, and hence the intersection 37 or marginal ridge of the front face 33, which serves as an outer peripheral cutting edge 39, is also inclined toward the rear face 42, i.e., toward the bottom 19 of the insert receiving recess 5, at an inclination angle $\beta$. Therefore, when the insert 31 in accordance with the present embodiment is employed in the end mill as described above, the axial rake angle $\gamma_{a2}$ of the rake surface is set so as to be positive at an absolute value equal to the difference between the inclination angle $\beta$ and the angle $\theta$ defined between the bottom 19 and the axis O of the tool body 1. Accordingly, by setting the inclination angle $\beta$ so as to be larger than the inclination angle $\theta$ of the bottom 19, the axial rake angle $\gamma_{a2}$ for the rake surface can be set so as to be positive even though the insert receiving recess 5 is formed in the forward end portion 2 of the tool body 1 such that the thickness H is gradually increased in an axially rearward direction of the tool body 1. With this construction, the cutting performance can be substantially improved while ensuring a sufficient rigidity at the forward end portion 2 of the tool body 1 which supports the insert 31 and undergoes a large cutting load.

Furthermore, in the prior art insert 7 in which the front and rear faces are formed parallel to each other, the radial rake angle $\gamma_{r1}$ is determined by the thickness H of the forward end portion 2 and the thickness of the insert 7. However, in order to impart a sufficient rigidity to the forward end portion 2 of the tool body 1 and the insert 7, these thicknesses cannot be reduced, so that the radial rake angle $\gamma_{r1}$ has been large in a negative direction. In contrast, in the end mill employing the insert 31 of the illustrated embodiment, the intersection 38 serving as the end cutting edge 40 is inclined toward the rear face 42, i.e., toward the bottom 19 of the insert receiving recess 5, at the inclination angle $\delta$, by causing the front face 33 to get inclined toward the rear face 42 in a direction away from the nose portion 34. With this construction, as long as the thickness T of the insert body 32 is equal to that of the prior art insert 7, the radial rake angle $\gamma_{r2}$ of the rake surface of the insert 31 can be set to a positive side by an amount of the difference between the inclination angle $\delta$. Consequently, the cutting performance can be even further improved.

In the above embodiment, although a positive insert is employed, the present invention may be applied to a negative insert. FIGS. 8 to 11 depict such a modification, and the same reference numerals are used to designate parts common with those in the first embodiment so that explanation thereof may be omitted.

Furthermore, various angles defined as above can be determined appropriately based on the dimensions and configuration of the insert, the cutting conditions or the like. However, in the case of a parallelogrammic insert having acute corners with an angle of between 70° and 85°, which is widely used, it is preferable that the inclination angles $\alpha$, $\beta$, and $\delta$ range from 3° to 20°, from 3° to 15°, and from 3° to 20°, respectively. In the previous embodiment specifically illustrated, the inclination angles $\alpha$, $\beta$ and $\delta$ are set to 11°29', 6° and 11°11', respectively. If the inclination angles $\alpha$, $\beta$ and $\delta$ are less than the above lower limits, i.e., if the front face 33 is moderate in slope, the axial and radial rake angles may not be made positive, and hence desired effects cannot be obtained. On the other hand, if these inclination angles exceed the above upper limits, i.e., if the front face is steep, the thickness of the insert body 32 at its central portion will become insufficient, so that the rigidity or strength of the insert 31 may be deteriorated.

Furthermore, the shape of the insert is not limited to the parallelogram, but may be modified to other tetragonal shapes such as a square or a rhombus, or to other polygonal shapes such as triangles, pentagons or the like.

FIGS. 12 to 15 depict a cutting insert 46 in accordance with another preferred embodiment of the present invention, in which the same reference characters are used to designate the parts or members similar to those of the previous embodiment of FIGS. 1 to 4 in order to simplify explanation thereof.

Figure 12:
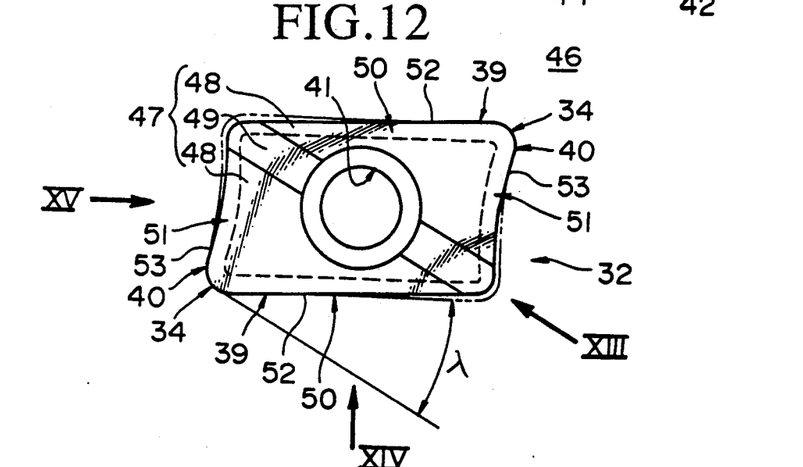
FIG. 12 is a plan view of a cutting insert in accordance with a further embodiment of the present invention.
Figure 13:
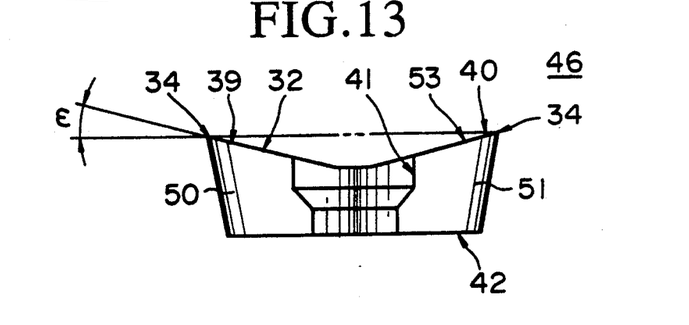
FIG. 13 is a side elevational view of the insert of FIG. 12 as seen in the direction indicated by the arrow XIII in FIG. 12.
Figure 14:
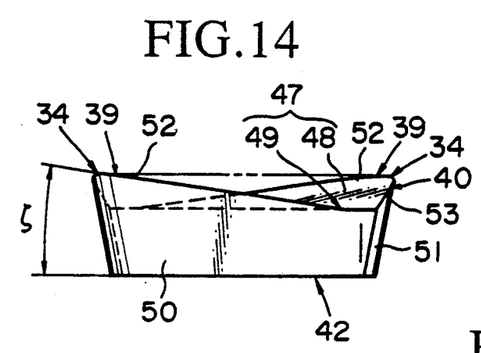
FIG. 14 is a side elevational view of the insert of FIG. 12 as seen in the direction indicated by the arrow XIV in FIG. 12.
Figure 15:
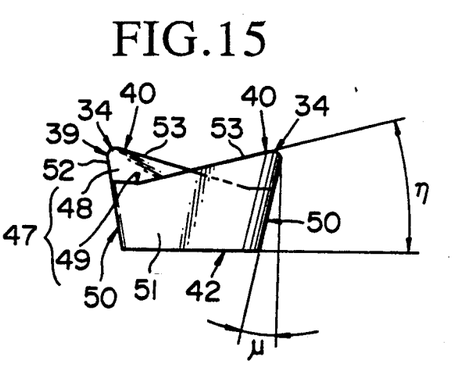
FIG. 15 is a side elevational view of the insert of FIG. 12 as seen in the direction indicated by the arrow XV in FIG. 2.

As is the case with the previous embodiment, the insert 46 in this embodiment is also of a positive type and includes a front face 47 having a diagonally opposite pair of acute corners each defining a respective nose portion 34. However, in this embodiment, the front face 47 of the insert body 32 is defined by a pair of inclined surfaces 48 each extending immediately from a respective nose portion 34 and sloping toward the rear face 42 of the insert body 32 in a direction away from the aforesaid nose portion 34 toward the diagonal line which connects a pair of obtuse corners of the front face 47 at an inclination angle $\epsilon$, and a flat surface 49 disposed between the inclined surfaces 48 so as to be parallel to the rear face 42. With this construction, as shown in FIGS. 14 and 15, respectively, the intersections 52 and 53 of the front face 47 with side faces 50 and 51 sandwiching the nose portion 34 are inclined at inclination angles $\zeta$ and $\eta$ toward the rear face 42 in a direction away from the nose portion 34 toward the obtuse corners, respectively. In addition, as shown in FIG. 12, each of the side faces 51, which extend from the intersections 53 serving as end cutting edges, is concavely shaped as viewed in plan.

In the insert 46 as described above, the same advantageous effects as in the previous embodiment can be attained since the intersections 52 and 53 serving as the cutting edges 39 and 40 are inclined toward the rear face 42 at the inclination angles $\zeta$ and $\eta$ due to the provision of the inclined surface 48 sloping toward the rear face 42 at the inclination angle $\epsilon$.

What is more, in the present invention, since the front face 47 is defined by the part of inclined surfaces 48 and the flat surface 49 interposed therebetween, a great thickness can be ensured at the central portion of the insert body 46, so that the inclination angle $\epsilon$ of the inclined surface 48 and the inclination angles $\zeta$ and $\eta$ of the intersections 52 and 53 can be determined so as to be larger than the corresponding angles $\alpha$, $\beta$ and $\delta$ in the previous embodiment, respectively. For example, in the previous embodiment in FIGS. 1 to 4, for a parallelogrammic insert having acute corners with an angle of between 70° and 85°, it is mentioned that the inclination angles $\alpha$, $\beta$, and $\delta$ should preferably range from 3° to 20°, from 3° to 15°, and from 3° to 20°, respectively. In this regard, in the above embodiment, the inclination angles $\epsilon$, $\zeta$ and $\eta$ are set to 15°, 8° and 14°44', respectively. Furthermore, as shown in FIG. 12, an angle $\lambda$, defined by the diagonal line connecting the obtuse angles of the front face 47 and the intersection 52 as viewed in plan, is set to about 30°, and, as shown in FIG. 15, a relief angle $\mu$ for the cutting edge 39 defined by the intersection 52 is set to 11°.

When the insert 46 of the above construction is employed in the insert cutter as previously described, both of the axial and radial rake angles can be made larger in a positive direction while maintaining the thickness of the central portion of the insert body 32. Therefore, the cutting performance can be improved while maintaining the rigidity and strength of the insert body 32.

Additionally, in the above embodiment, the side face 51 is curved concavely as viewed in plan. With this construction, the positioning of the insert 31 becomes easy, and the maximum depth of cut can be increased.

Figure 16:
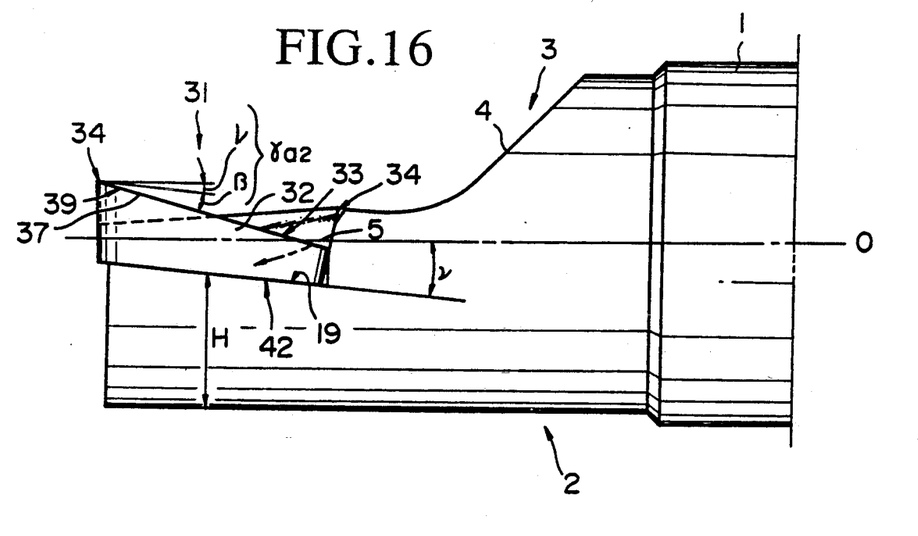
FIG. 16 is a side elevational view of an end mill in which the insert of FIG. 1 is attached to an end mill body having a forward end portion of a relatively large diameter.

FIG. 16 depicts a modification in which the insert 31 shown in FIGS. 1 to 4 is secured to a forward end portion 2 of a tool body 1 having a relatively great outer diameter, and the same reference numerals are used to designate similar parts or members to simplify an explanation thereof.

In this tool, since the outer diameter of the forward end portion 2 is great, a relatively high rigidity can be ensured thereat. Accordingly, as shown in FIG. 16, in this embodiment, the bottom 19 of the insert receiving recess 5 can be formed so as to be inclined with respect to the axis O of the tool body 1 at an inclination angle $\nu$ in such a manner that the thickness H of the forward end portion 2 of the tool body 1 is gradually decreased in an axially rearward direction, although in the end mills shown in FIGS. 5 to 7 and FIGS. 19 to 21, the bottom 19 must be formed such that the thickness H of the forward end portion 2 is gradually increased in an axially rearward direction of the tool body 1. As a result, even when the prior art insert 7 as shown in FIGS. 19 to 21 is secured to the insert receiving recess 5, the axial rake angle can be set to a positive angle equal to the inclination angle $\nu$.

In this connection, when the insert 31 of the present embodiment is employed, the axial rake angle $\gamma_{a2}$ is the summation of the inclination angle $\nu$ of the bottom 19 of the insert receiving recess 5 and the inclination angle $\beta$ of the cutting edge 39. Namely, as compared with the use of the prior art insert 7, the axial rake angle $\gamma_{a2}$ can be made greater in a positive direction by an amount of the inclination angle $\beta$, so that the cutting performance can be further improved.

Figure 17A:
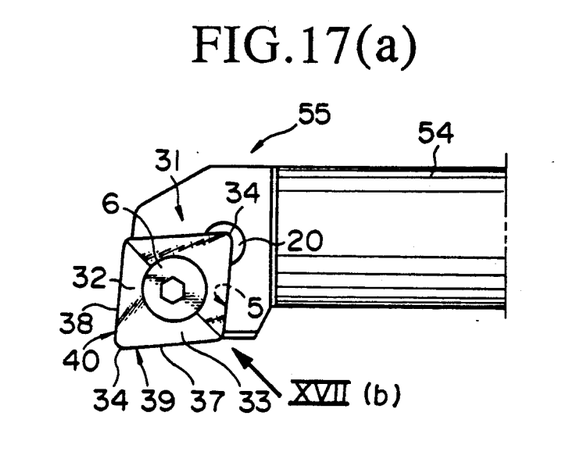
FIG. 17(a) is a plan view of a turning tool in which a cutting insert of the invention is employed.
Figure 17B:
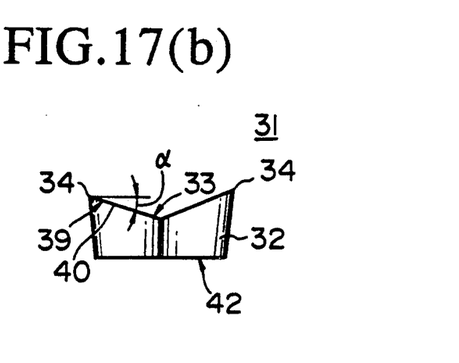
FIG. 17(b) is a side elevational view of a cutting insert secured to the tool of FIG. 17(a), as seen in the direction indicated by the arrow XVII(b) in FIG. 17(a)
Figure 18A:
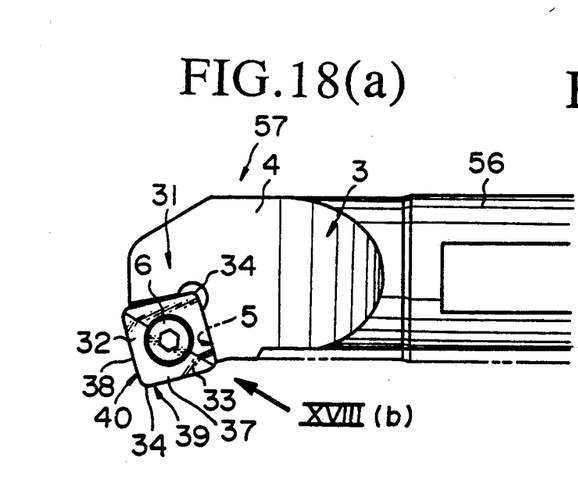
FIG. 18(a) is a plan view of a boring bar in which a cutting insert of the invention is employed.
Figure 18B:
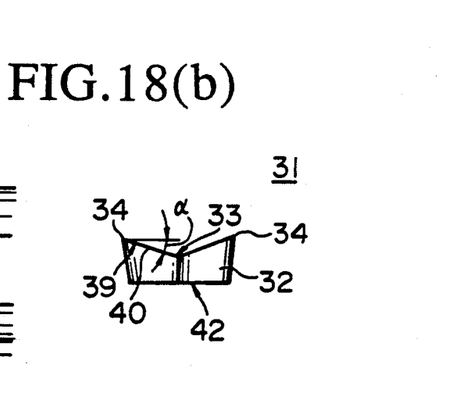
FIG. 18(b) is a side elevational view of a cutting insert secured to the tool of FIG. 18(a), as seen in the direction indicated by the arrow XVIII(b) in FIG. 18(a)

In the foregoing, the present invention has been applied to a rotary cutter such as an insert end mill. However, the present invention may be applied to a continuous cutting tool as shown in FIG. 17, or to a boring bar as shown in FIG. 18. In FIG. 17(a), the reference numerals 54 and 55 denote a tool holder and its forward end portion, respectively, and in FIG. 18(a), the reference numerals 56 and 57 denote a tool body of the boring bar and its forward end portion, respectively. In addition, FIG. 17(b) and FIG. 18(b) show side elevational views of the insert 31 as viewed along the diagonal line connecting the obtuse corners of the front face 33, respectively.

Obviously, many modifications and variations of the present invention are possible in the light of the above. It is therefore to be understood that within the scope of the appended claims, the invention may be practiced otherwise than as specifically described.

What is claimed is:

1. A cutting insert comprising:
   a tetragonal plate-like insert body defined by a front face, a flat rear face and two opposite pairs of side faces disposed between said front face and said rear face, said insert body including:
   a pair of generally straight main cutting edges defined by the intersections of said front face with one opposite pair of said side faces,
   a pair of auxiliary cutting edges defined by the intersections of said front face with the other opposite pair of said side faces, and
   a pair of nose portions defined by an opposite pair of corners of said front face, each nose portion being disposed between a respective main cutting edge and a respective auxiliary cutting edge so as to intersect therewith, said front face having a pair of inclined surfaces each extending immediately from a respective nose portion and sloping toward said rear face in a direction toward a diagonal line of the front face which connects the corners of the front face other than the corners defining said nose portions.

2. A cutting insert as recited in claim 1, wherein said pair of inclined surfaces are directly joined to each other.

3. A cutting insert as recited in claim 1, wherein said front face is defined by said pair of inclined surfaces and a flat surface disposed between said inclined surfaces.

4. A cutting insert as recited in claim 2, wherein said insert body is of a parallelogrammic shape having two acute corners with an angle of between 70° and 85°, said inclined surface having an inclination angle ranging from 3° to 20°, the intersection defining said main cutting edge having an inclination angle ranging from 3° to 15°, said intersection defining said auxiliary cutting edge having an inclination angle ranging from 3° to 20°.

5. A cutting insert as recited in claim 1, wherein the other opposite pair of said side faces are concavely formed as viewed from said front face.

6. A cutting insert comprising:
 a tetragonal plate-like insert body defined by a front face, a rear face and two opposite pairs of side faces disposed between said front face and said rear face, said insert body including:
  a pair of main cutting edges defined by the intersections of said front face with one opposite pair of said side faces,
  a pair of auxiliary cutting edges defined by the intersections of said front face with the other opposite pair of said side faces, and
  a pair of nose portions defined by an opposite pair of corners of said front face, each nose portion being disposed between a respective main cutting edge and a respective auxiliary cutting edge so as to intersect therewith, said front face having a pair of inclined surfaces each extending immediately from a respective nose portion and sloping toward said rear face in a direction toward a diagonal line of the front face which connects the corners of the front face other than the corners defining said nose portions, the other opposite pair of said side faces being concavely formed as viewed from said front face.

* * * * *